(12) United States Patent
Hammons et al.

(10) Patent No.: US 11,275,495 B2
(45) Date of Patent: Mar. 15, 2022

(54) CUSTOMIZABLE USER INTERFACE ELEMENT VISUALS FOR AN INFORMATION HANDLING SYSTEM

(71) Applicant: Dell Products L.P., Round Rock, TX (US)

(72) Inventors: Marc Randall Hammons, Round Rock, TX (US); Erik Summa, Austin, TX (US); David Joseph Zavelson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/774,973

(22) Filed: Jan. 28, 2020

(65) Prior Publication Data
US 2021/0232300 A1 Jul. 29, 2021

(51) Int. Cl.
*G06F 3/0481* (2013.01)
*G06F 3/0482* (2013.01)
*G06F 3/0484* (2013.01)
*G06F 3/04847* (2022.01)
*A63F 13/53* (2014.01)
*A63F 13/63* (2014.01)
*G06F 3/01* (2006.01)

(52) U.S. Cl.
CPC .......... *G06F 3/04847* (2013.01); *A63F 13/53* (2014.09); *A63F 13/63* (2014.09); *G06F 3/013* (2013.01); *A63F 2300/308* (2013.01); *G06F 2203/04804* (2013.01)

(58) Field of Classification Search
None
See application file for complete search history.

(56) References Cited

U.S. PATENT DOCUMENTS 8,908,987 B1 * 12/2014 Krishnaswamy ....... G06T 5/001
 382/260
2011/0006978 A1 * 1/2011 Yuan ..................... G06F 3/0481
 345/156

(Continued)

OTHER PUBLICATIONS

Iacovides et al. "Removing the HUD : The impact of non-diegetic game elements and expertise on player involvement", In: CHI Play 2015—Proceedings of the 2015 Annual Symposium on Computer-Human Interaction in Play. 2nd ACM SIGCHI Annual Symposium on Computer-Human Interaction in Play, CHI Play 2015, Oct. 5-7, 2015, pp. 13-22, Association for Computing Machinery, Inc , GBR.

(Continued)

*Primary Examiner* — Jordany Nunez
(74) *Attorney, Agent, or Firm* — Norton Rose Fulbright US LLP (57) ABSTRACT

User interactions with information handling systems can be improved by providing real-time feedback to the user during use of an application on the information handling system. A user's focused attention can be determined and the user interface elements in an application window be customized to the user. The user's focus attention thus changes the display of user interface elements on the screen. Using such a technique, user interface elements of lower importance can be de-emphasized or removed from the application window, which improves the user's access to user interface elements of greater importance.

20 Claims, 10 Drawing Sheets

(56) References Cited

U.S. PATENT DOCUMENTS

| | | | | |
|---|---|---|---|---|
| 2012/0326969 A1* | 12/2012 | Ramanathan | ........... | G06F 3/013 |
| | | | | 345/156 |
| 2014/0071069 A1* | 3/2014 | Anderson | ............... | G06F 3/013 |
| | | | | 345/173 |
| 2014/0160148 A1* | 6/2014 | Barkett | ................... | G06T 11/60 |
| | | | | 345/619 |
| 2015/0286873 A1* | 10/2015 | Davis | .................... | G06F 1/1694 |
| | | | | 382/103 |
| 2016/0062579 A1* | 3/2016 | Lee | ......................... | G06F 9/453 |
| | | | | 715/708 |
| 2017/0139475 A1* | 5/2017 | Eivazi | ................... | G06F 3/0482 |
| 2017/0357518 A1* | 12/2017 | Kozloski | ................. | G06F 3/013 |

OTHER PUBLICATIONS

McEwan and Price, "Technical Paper, Companion Displays Offer Exciting Possibilities", Intel, 2019, https://software.intel.com/sites/default/files/managed/49/60/companion-displays-give-game-devs-new-options.pdf.

Olim, Oscar "pCars vHUD", Microsoft, 2015, https://www.microsoft.com/en-us/p/pcars-vhud/9nblggh58tpc?activetab=pivot:overviewtab.

Rockstar Games, "Red Dead Redemption 2 Companion App", Oct. 23, 2018, https://www.rockstargames.com/newswire/article/60648/The-Red-Dead-Redemption-2-Official-Companion-App.

\* cited by examiner

CUSTOMIZABLE USER INTERFACE ELEMENT VISUALS FOR AN INFORMATION HANDLING SYSTEM

FIELD OF THE DISCLOSURE

The instant disclosure relates to information handling systems. More specifically, portions of this disclosure relate to customization of user interface elements in an application window.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Applications executing on information handling systems often include many user interface elements, particularly as applications have grown more complex over time. For example, modern personal computer (PC) games offer unparalleled graphical fidelity and new innovative gameplay elements. With these gameplay elements however, there can be added complexity. Communicating these features to the user can add clutter the screen. For example, there can be many buttons, and status indicators on-screen, which prevents a portion of the screen from being used for gameplay.

SUMMARY

User interactions with information handling systems can be improved by providing real-time feedback to the user during use of an application on the information handling system. According to embodiments of this disclosure, a user's focus attention can be determined and the user interface elements in an application window be customized to the user. The user's focus attention thus changes the display of user interface elements on the screen. Using such a technique, user interface elements of lower importance can be de-emphasized or removed from the application window, which improves the user's access to user interface elements of greater importance.

The application window and corresponding user interface customizations may be defined as part of an application profile. The application profile may be defined by a user, pre-defined as part of a software installation, and/or downloaded from other sources, such as communities on the Internet, and installed on an information handling system. The application profile includes definitions of user interface elements in an application window of an application. The definitions may specify one or more regions of a window of the application that correspond to user interface elements for customization. Those regions of the application window may be modified during execution of the application based on user feedback that indicates the user's focus attention. The application profiles may allow user interface customization without any hooks or special programming in the application. Thus, the customization may be provided for any application that the information handling system executes, which provides the user with significantly more opportunities for improved user experience and customized user experience than possible through particular code inserted in the applications.

According to one embodiment, a method of applying a customization to a user interface element in an application window may include receiving, by an information handling system, an indication of a user's focused attention; identifying at least one user interface element receiving the user's focused attention; and applying at least one customization to the identified at least one user interface element. Such a method may be executed by an information handling system by configuring a processor to perform the method. The code to cause execution of the method by the processor may be stored in a non-transitory computer readable medium of a computer program product.

According to another embodiment, a method of generating customization rules for application to a user interface element in an application window may include receiving, by an information handling system, a screen shot of an application window; identifying a potentially-customizable user interface element within the application window; and receiving a first user-defined rule specifying the potentially-customizable user interface element and a customization for the one of the potentially-customizable user interface elements.

In some embodiments, the application profile that defines the user interface customization may also include definitions of other application-related effects. For example, the application profile may include definitions of lighting effects related to events that are defined for regions of the application window as described in U.S. patent application Ser. No. 16/656,432 filed on Oct. 17, 2019, which is incorporated herein by reference.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
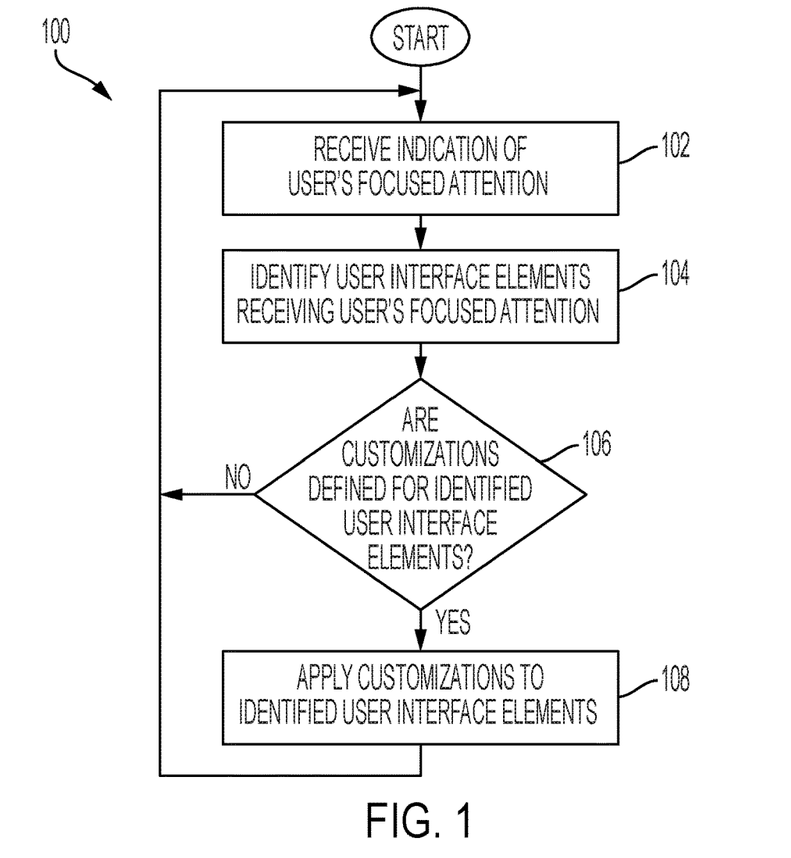
FIG. 1 is a flow chart illustrating a method of customizing user interface elements based on user feedback according to some embodiments of the disclosure.

FIG. 1 is a flow chart illustrating a method of customizing user interface elements based on user feedback according to some embodiments of the disclosure. A method 100 begins at block 102 with receiving an indication of a user's focused attention. The indication may be a direction, location, or area in an application window. The indication may be received from hardware coupled to the information handling system, such as a front-facing camera, an infrared camera, a mouse movement, a joystick movement, a controller movement, an accelerometer, a gyroscope, eye/gaze-tracking mechanism, or any other input device. At block 104, user interface elements may be identified based that are receiving the user's focused attention. For example, a user interface element that appears in the user's gaze may be identified to be receiving the user's focused attention. As another example, a user interface element that appears in the future path of the user's mouse based on the mouse cursor's trajectory may be identified to be receiving the user's focused attention. At block 106, the information handling system determines whether there are customizations defined for identified user interface elements. If none are defined, the method 100 returns to block 102 to receive a new indication of the user's focused attention and process the new indication. If customizations for the user interface elements are identified, the method 100 continues to block 108 to apply the defined customizations to the identified user interface elements. The customizations may be specific to a particular user interface element. For example, one user interface element that receives the user's focused attention may be made less transparent, whereas another user interface element that receives the user's focused attention may have the saturation of its colors increased. The customizations may be generic rules applied to multiple or all user interface elements. For example, a customization may specify that any user interface element not in the user's focused attention should be set to 50% transparency and any user interface element that is in the user's focused attention should be set to 0% transparency.

Figure 2:
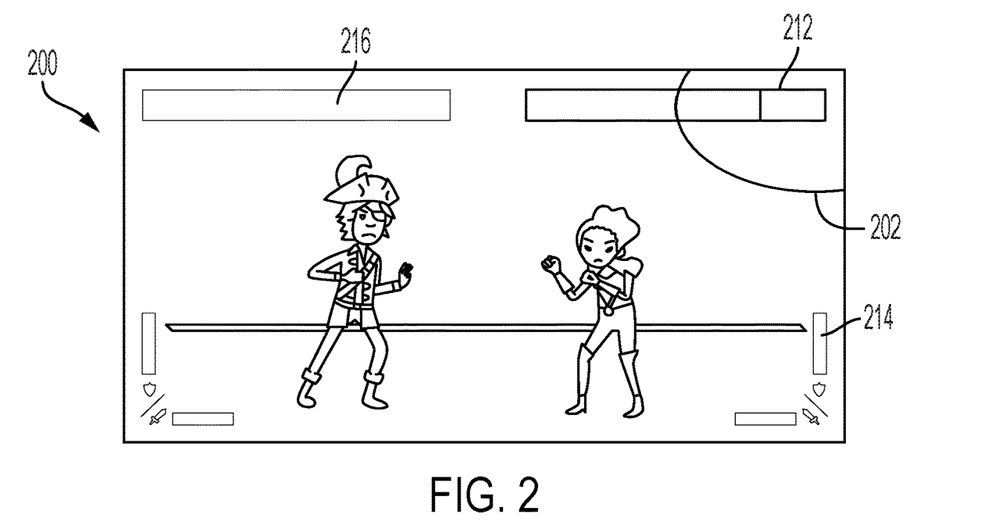
FIG. 2 is a screen shot illustrating a customized user interface element based on a user's focus attention according to some embodiments of the disclosure.
Figure 3:
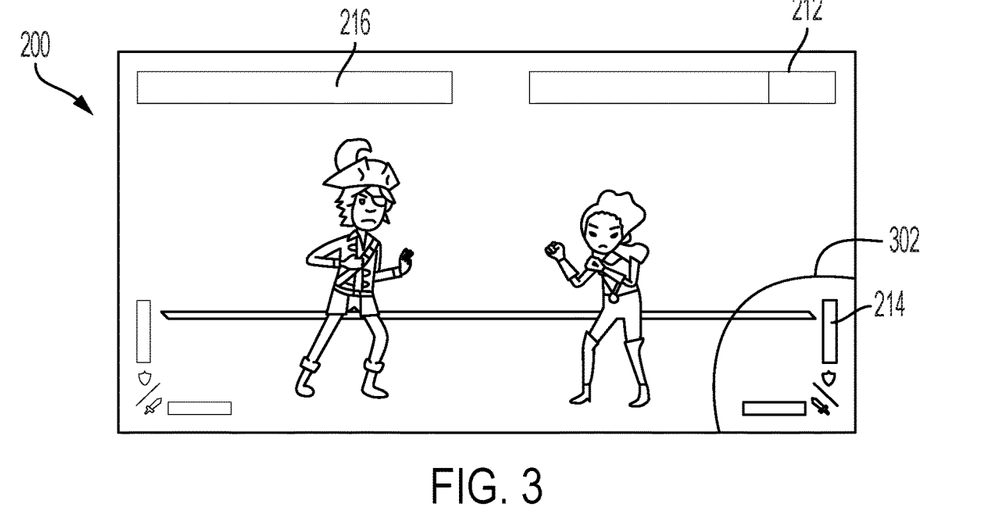
FIG. 3 is a screen shot illustrating a customized user interface element based on a change in user's focus attention according to some embodiments of the disclosure.

One example application of the method of FIG. 1 is shown in FIG. 2 and FIG. 3. FIG. 2 is a screen shot illustrating a customized user interface element based on a user's focus attention according to some embodiments of the disclosure. Screen shot 200 shows a game with user interface elements 212, 214, and 216. A user's focused attention 202 on the screen shot 200 corresponds to user interface element 212. User interface element 212 is thus made solid with 0% transparency. Other user interface elements 214 and 216 are set to 50% transparent to improve the user's focus on user interface element 212. The user's focused attention may shift on the screen shot 200. FIG. 3 is a screen shot illustrating a customized user interface element based on a change in user's focus attention according to some embodiments of the disclosure. The user's new focused attention 302 corresponds to user interface element 214. In response user interface element 214 is made opaque, and user interface elements 212 and 216 are set to 50% transparent.

Figure 4:
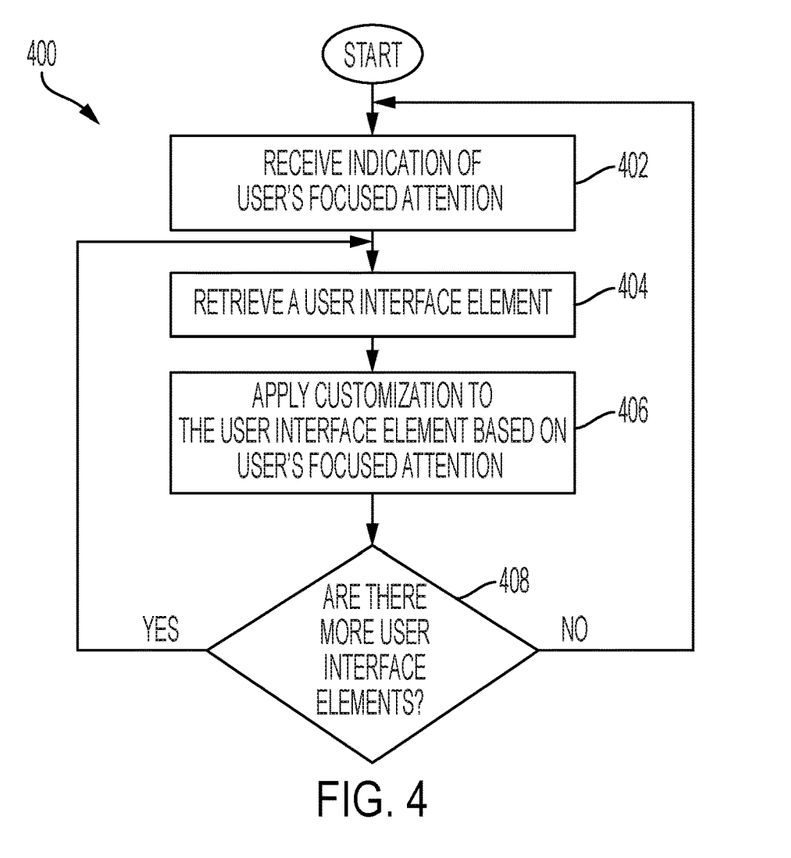
FIG. 4 is a flow chart illustrating another method of customizing user interface elements based on user feedback according to some embodiments of the disclosure.

Another method for processing the user interface elements based on the user's focused attention is shown in FIG. 4. FIG. 4 is a flow chart illustrating another method of customizing user interface elements based on user feedback according to some embodiments of the disclosure. A method 400 begins at block 402 with receiving an indication of a user's focused attention. Based on the received indication, an information handling system executing method 400 traverses a list of known user interface elements to update the user interface elements based on the user's focused attention. At block 404, a first user interface element is retrieved from a list. At block 406, the information handling system determines if that user interface element has an assigned customization, whether by a specific or generic rule, and applies the customization. At block 408, the information handling system determines if there are additional user interface elements to process. If so, the method 100 returns to blocks 404 and 406 to apply customizations to other user interface elements based on the user's focused attention indication from block 402. The method 400 returns to block 402 to wait for a change in the user's focused attention when all the user interface elements are processed.

Figure 5:
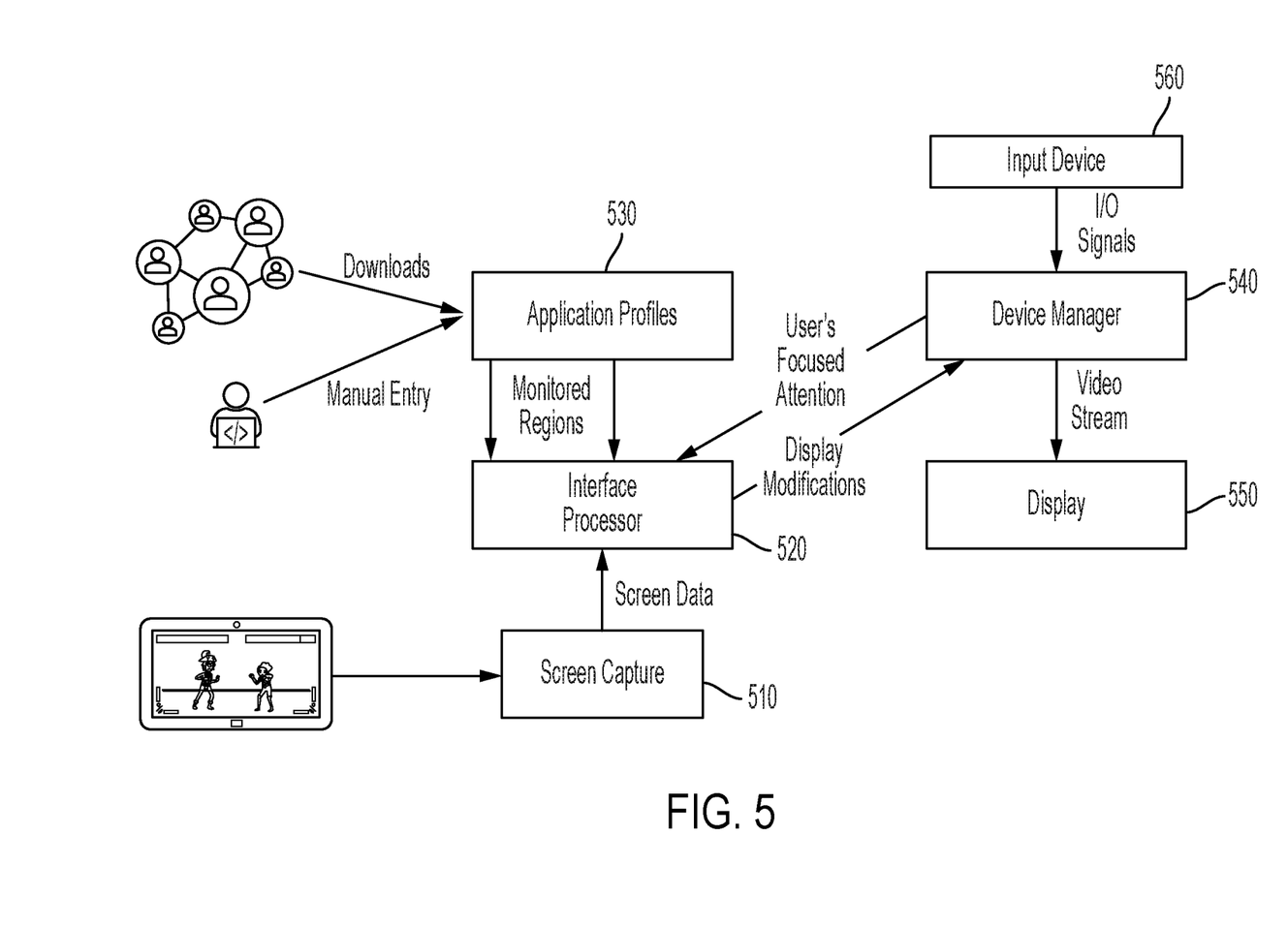
FIG. 5 is a block diagram illustrating application of user interface effects during execution of an application according to some embodiments of the disclosure.

One embodiment for implementation of user interface effects for an application executing on an information handling system is shown in FIG. 5. FIG. 5 is a block diagram illustrating application of user interface effects during execution of an application according to some embodiments of the disclosure. An application window may be rendered by an information handling system and displayed on a display screen. The rendered screen may be captured by a screen capture tool 510. The screen capture tool 510 may obtain the rendered screen in parallel with the display of information in the application window, for example, through hooks in graphics APIs such as DirectX and OpenGL or through reading out the physical graphics memory. The screen capture tool 510 may alternatively obtain the rendered screen after display in the application window through a screen capture. The screen data from the application window is provided from the screen capture tool 510 to an interface processor 520.

The interface processor 520 applies user interface customization to the provided screen data based on an indication of the user's focused attention from input device 560. The display customizations are provided to a device manager 540 that controls hardware to carry out the customization of the user interface elements, such as by overwriting pixel values in a graphics memory and/or issuing commands to a graphics processing unit or central processing unit to modify the user interface elements. For example, when the interface processor 520 determines that a change in transparency for a user interface element is triggered, the interface processor 520 sends such a display modification to the device manager 540. The device manager 540 then causes the information handling system to transmit an appropriate video stream to the display 550.

The interface processor 520 may be implemented as a rule-based engine, which processes rules defined in application profiles by applying the screen data and user's focused attention as input to the rules. For example, the interface processor 520 may process a rule defining a transparency level for a user interface element when the user's focused attention is within a certain number of pixels of the user interface element. Thus, the rule may specify both a proximity of the user's focused attention for activating the rule, the user interface element to be customized defined as a region of pixels, and the customization to be applied to the user interface element. As another example, the interface processor 520 may process a rule defining color desaturation (e.g., turning everything black and white) within a certain number of pixels of a user's focused attention. The set of one or more customizations may be obtained from an application profile store 530. In the application profile store 530, the application profiles may define regions on a screen for a user interface element and may define customizations that occur in response to triggering the user interface element with the user's focused attention.

The interface processor 520 may be implemented as an application executing on a same or different processor than a processor executing the application that is generating the application window 110. When executed as software, the interface processor 520 may operate as a background process on the information handling system that monitors all applications and activates application profiles by detecting the loading and executing of applications. In some embodiments, the interface processor 520 may be launched in response to the loading of an application with a defined application profile.

The interface processor 520 may alternatively be implemented as a separate hardware component, such as an application-specific integrated circuit (ASIC), separate from the processor executing the application that generates the application window. In some embodiments, the functionality of the interface processor 520 may be shared between a generic processor and other hardware circuitry, such as a graphics processing unit or an embedded controller.

An application profile may include one or more customizations for user interface elements in an application. Application profiles may be associated with a "GAME.EXE" application. Applications may be identified by filenames, process names, process identifiers, or other unique names. The application profiles may be placed in the application profile store 530 from one or more sources. Example sources are shown in FIG. 3, and include downloads and manual entry. Application profiles may be manually entered into the application profile store 530 by a user, which allows complete customization of lighting effects with any application. Users that define their own customizations may share their application profiles with others, who may further customize the application profiles and share the revised application profiles. Application profiles may also be made available through any other technique for file sharing, such as USB drives, online cloud storage, CD-ROMs, e-mail, network file shares, and the like.

Figure 6:
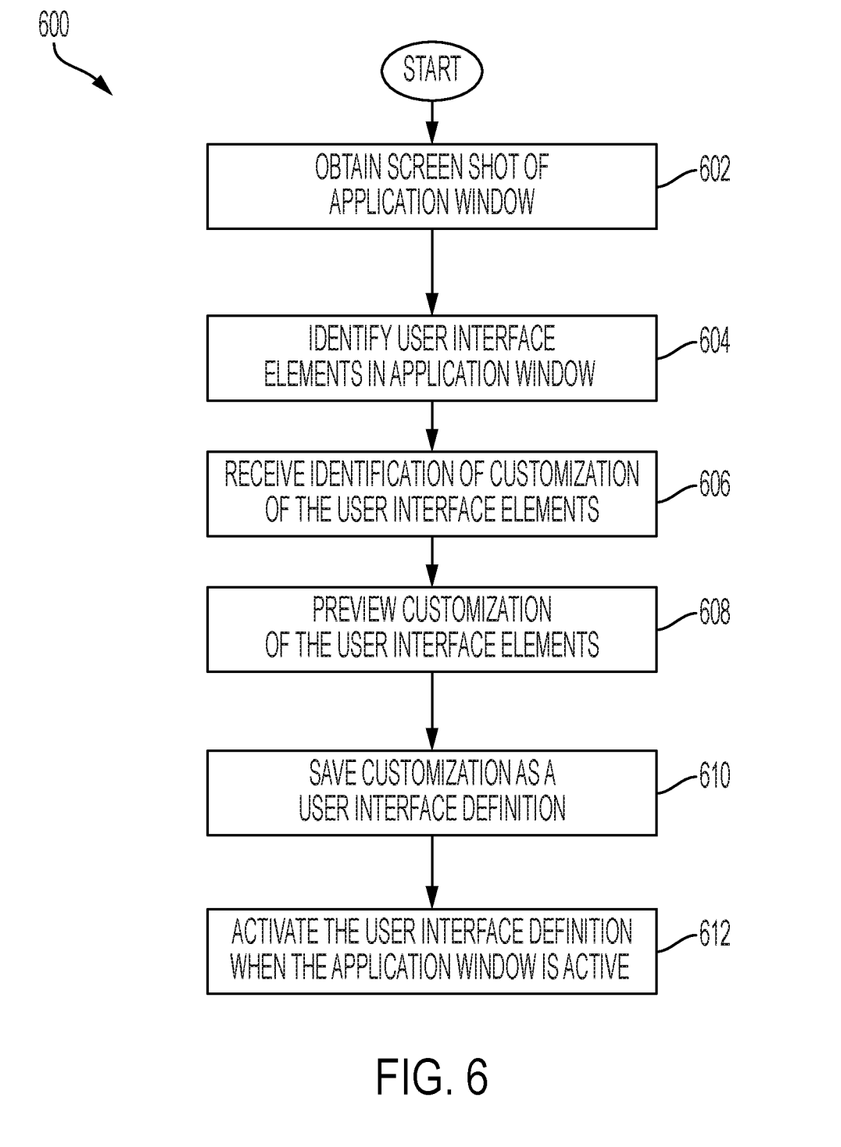
FIG. 6 is a flow chart illustrating a method of defining an application profile having customized user interface elements according to some embodiments of the disclosure.
Figure 7:
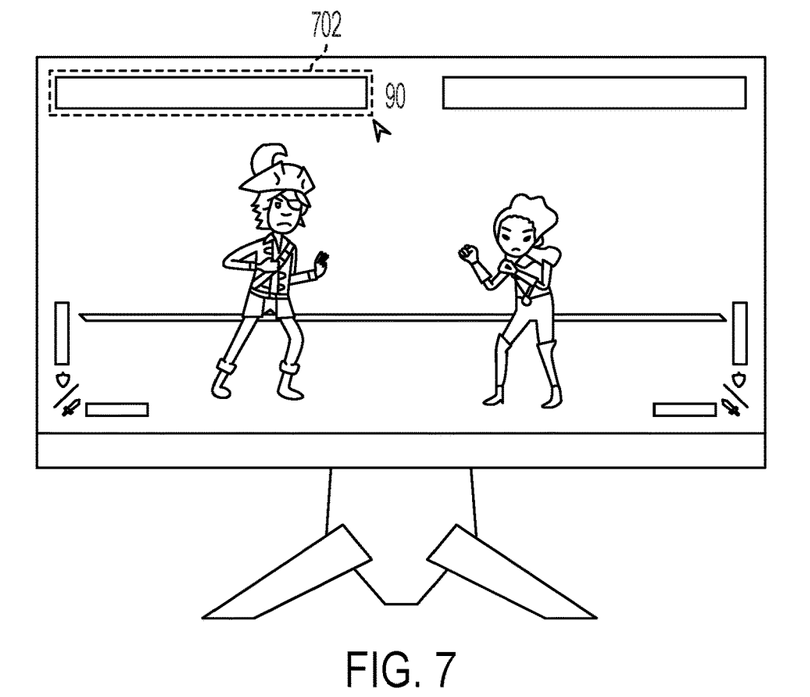
FIG. 7 is a screen shot illustrating defining of a user interface element according to some embodiments of the disclosure.

The application profiles may be defined by a user on an information handling system through a method such as that shown in FIG. 6. FIG. 6 is a flow chart illustrating a method of defining an application profile having customized user interface elements according to some embodiments of the disclosure. A method 600 begins at block 602 with obtaining a screen shot of an application window that includes user interface elements to be customized. At block 604, user interface elements are identified in the application window based on the screen shot obtained at block 602. The user interface elements may be determined by having a user paint the edges of the user interface element. The user interface elements may alternatively be determined by having the user select a region of the screen and using an algorithm to identify the pixels belonging to the user interface element by searching for borders and/or similar colors. One example definition is shown in FIG. 7. FIG. 7 is a screen shot illustrating defining of a user interface element according to some embodiments of the disclosure. A region 702 may be defined by the user around a health bar display in a game.

Figure 8:
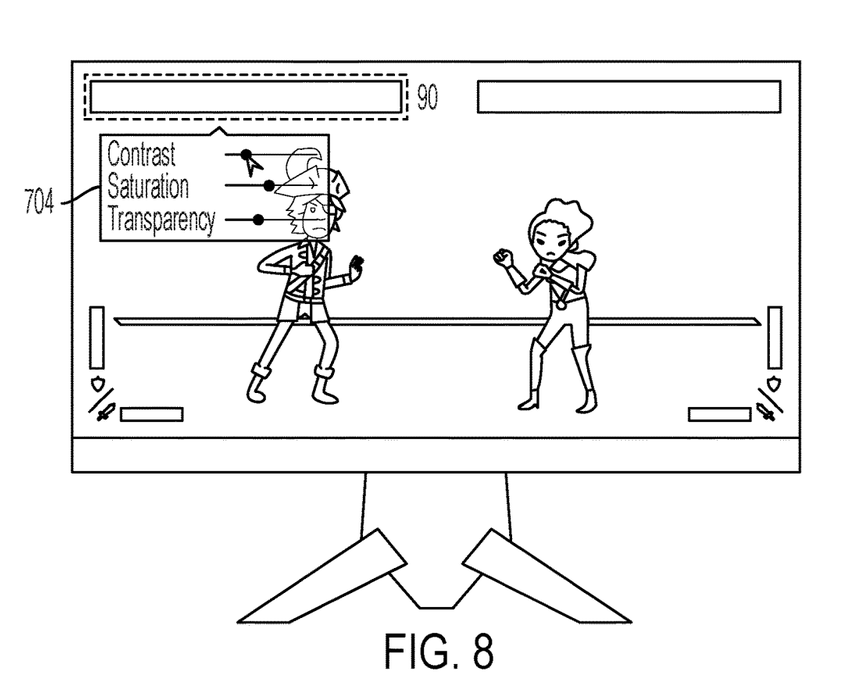
FIG. 8 is a screen shot illustrating defining of a customization of a user interface element according to some embodiments of the disclosure.

Next, at block 606, the information handling system receives from the user an identification of customizations to be applied to the user interface elements identified in block 604. The customizations may be defined using rules as described above. One example customization is shown in FIG. 8. FIG. 8 is a screen shot illustrating defining of a customization of a user interface element according to some embodiments of the disclosure. A control box 704 allows the user to apply a customization to the user interface element identified within region 702. The customization may include adjusting a contrast, adjusting a saturation, adjusting a transparency, adjusting a tint, adjusting a color map, and/or applying other graphics effects to the user interface element within region 702.

Figure 9:
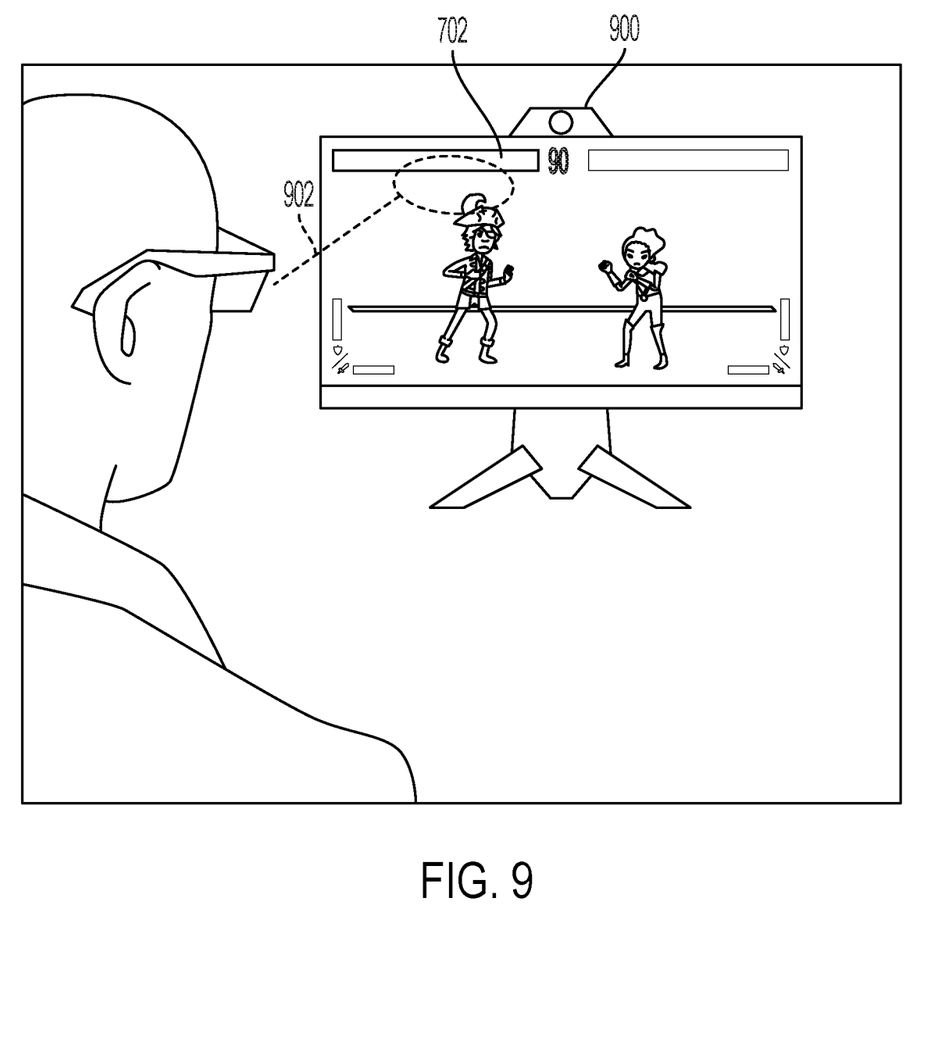
FIG. 9 is a screen shot illustrating application of user interface element customization based on eye gaze according to some embodiments of the disclosure.

At block 608, a preview of the customization may be provided to the user to allow the user to confirm the settings. An example transparency operation is previewed in FIG. 9. FIG. 9 is a screen shot illustrating application of user interface element customization based on eye gaze according to some embodiments of the disclosure. A user's gaze 902 may be detected by a front-facing camera 900. When the user's gaze is matched to the user interface element 702, the user interface element 702 is made opaque while other user interface elements are made 50% transparent.

The customization is completed at block 610 with the customization saved as a user interface element definition into an application profile corresponding to the application the screen shot was obtained at block 602. At block 612, the user interface customization is activated when the application is executing and the application window is active. The steps of method 600 may be implemented in a software module for execution by the information handling system that is separate from the software corresponding to the application. Thus, the customizations may be applied to user interface elements of any application executed by the information handling system.

Figure 10:
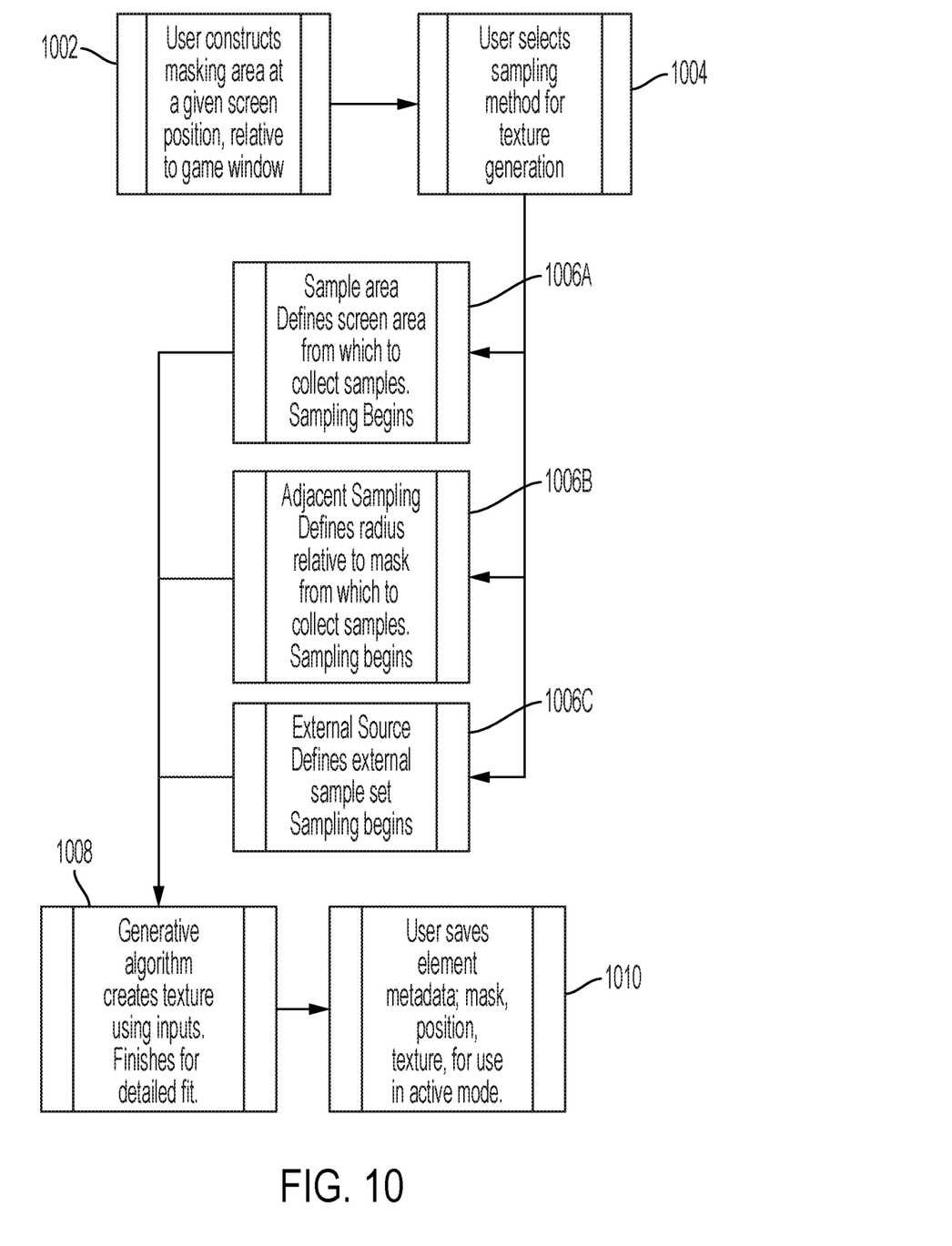
FIG. 10 is a flow chart illustrating defining of user elements and customization of those user elements according to some embodiments of the disclosure.
Figure 11:
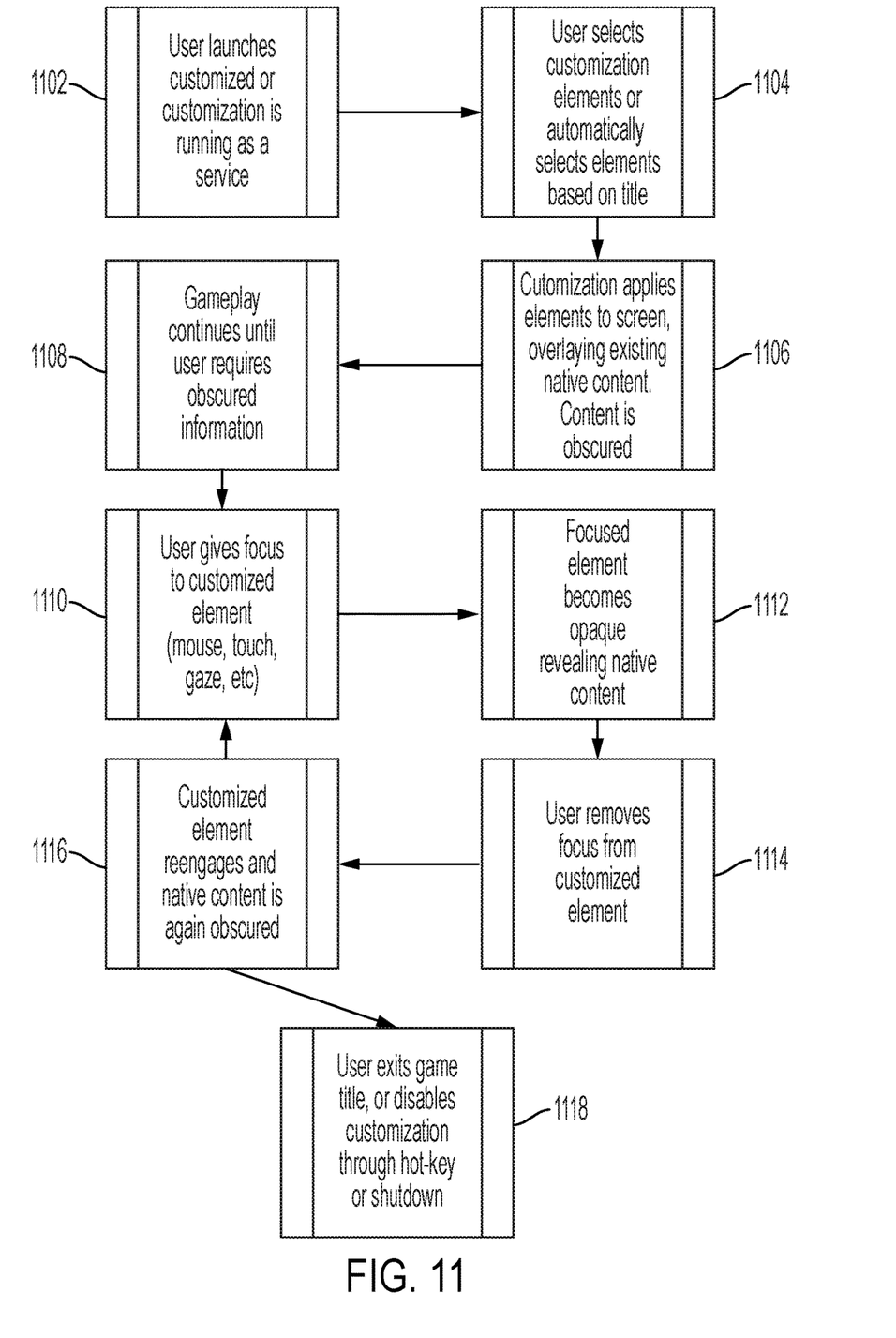
FIG. 11 is a flow chart illustrating application of defined customizations according to some embodiments of the disclosure.

Additional details regarding some embodiments of a method for user interface element customization is shown in FIG. 10 and FIG. 11. FIG. 10 is a flow chart illustrating defining of user elements and customization of those user elements according to some embodiments of the disclosure. A texture may be identified for the application of customization to user interface elements. For example, when a user interface's transparency is adjusted a texture may be defined for specifying the color of pixels used behind the now-transparent user interface element. At block 1002, a user constructs a masking area from within the application window defined by a screen position, which may be specified as an absolute coordinate or a relative coordinate with respect to the application window. Overlaying the screen, the user constructs a masking area using various construction shapes and operators (e.g. rectangle, oval, magic-wand, intersection, union, addition, subtraction tools). A user is able to label the constructed masking area, e.g. zone_1, and uses it as a point of reference in the flow. This is stored as a customizable element and metadata about the mask composition and screen location are stored against the label.

At block 1004, a user selects a sampling method for texture generation from one of blocks 1006A, 1006B, and 1006C. At block 1006A, a sample area defines a screen area from which to collect samples and sampling begins to define the texture. In sample area mode, user is able to select a zone of the display that will be used as sample input for generative algorithms. At block 1006B, adjacent sampling is defined by a radius relative to a mask from which to collect samples and sampling begins to define the texture. In adjacent sampling mode, a user-defined radius about the mask determines the area which generative algorithms will sample. In immediate adjacency mode and selected sample area mode begin to sample the indicated areas, creating inputs for the texture generation algorithm. At block 1006C, an external source defines an external sample sent for sampling, and sampling begins to define the texture. In external source mode, the user is able to specify external images used as input to generative algorithms. At block 1008, a generative algorithm creates a texture using inputs from blocks 1006A, 1006B, and/or 1006C and finishes the texture for a desired fit into a user interface element area. Having acquired samples, texture generation then begins using established methods, e.g. texture GAN, SRGAN, ESRGAN, Single Image Super Resolution (SISR). Finishing algorithms analyze and adapt the generated texture to provide fine-grained continuity with the overlaid background, e.g., pallet sampling at the mask edge in order to weave textures together. At block 1010, the user saves a rule with user interface element metadata, a mask, a position, and a texture definition. The user may be presented with generated texture results and may make optional adjustments to transparency, saturation, hue, and/or palette.

FIG. 11 is a flow chart illustrating application of defined customizations according to some embodiments of the disclosure. At block 1102, the user launches or toggles the customization engine into application mode. The engine may run passively in the background as a service and only become active when a new application is launched. At block 1104, when a game title is present, the user can select customization elements to apply or the customization engine can detect the game title automatically and apply appropriate elements. Over time, customization engine can determine when to apply elements based upon user behavior through telemetry collection and tracking enablement of a set of elements over time, and then developing a predictive model to determine when the user wants to enable those elements. At block 1106, the customization engine applies elements using positional information, generated textures, and metadata about overlay characteristics, transparency, saturation, and/or hue. A set of user interface elements are rendered as an overlay on top of the existing gaming application, relative to its window position (e.g., full screen, windowed, borderless windowed) and scales with the application. Applied elements may obscure the underlying content and serve to provide a more immersive experience for the user, in some cases using a similar texture and motif of the game title, and in others a contrast to the original content. At block 1108, gameplay continues until the user requires the obscured information by, at block 1110, the user focus shifts to the customized element. At block 1112, the obscured content in its native form, either indefinitely or for a configurable period of time upon expiry of which the element overlay is reengaged. At block 1114, as the user's focused attention moves out of contact with the user interface element the customization applies at block 1116 to obscure the native content. Focus attention may be determined by, for example, a mouse over, pen, touch, eye gaze, and/or track pad. The customization ceases at block 1118 when the user exits the application, toggles the capability with a hot-key, or when a relevant game title can no longer be detected.

Figure 12:
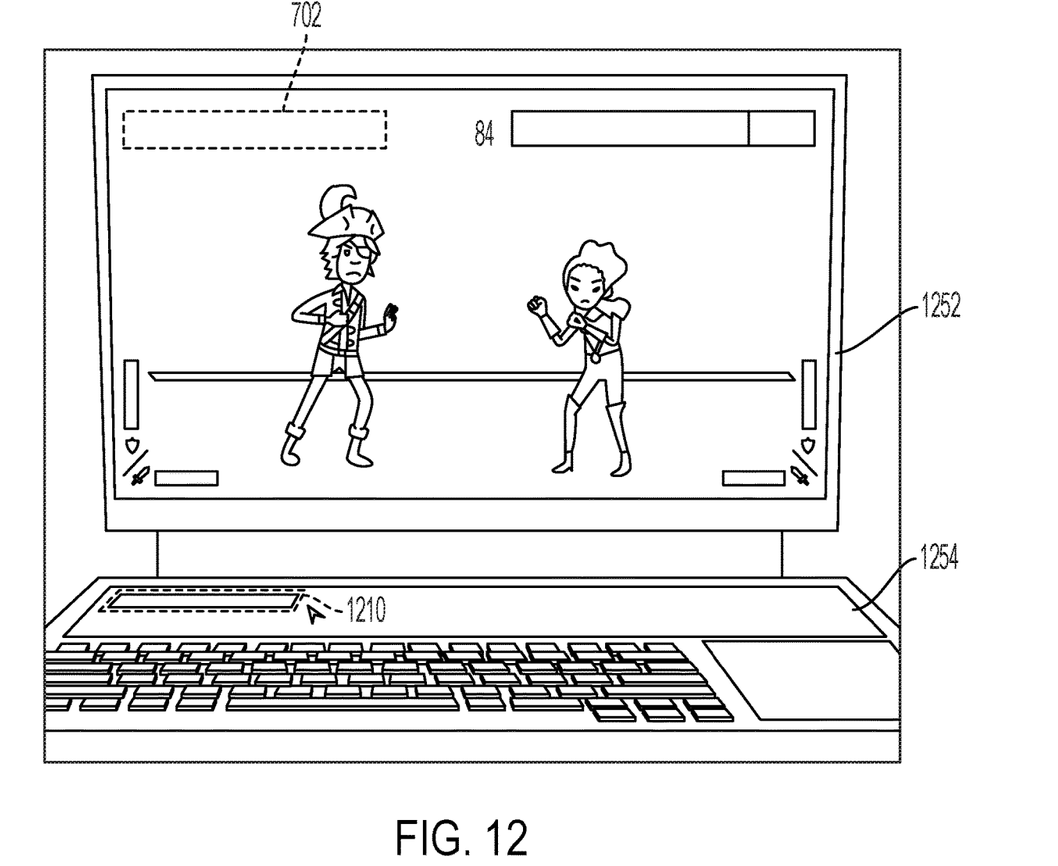
FIG. 12 is a screen shot illustrating customization of a user interface element by moving the user interface element to a second display according to some embodiments of the disclosure.

Another example customization that may be applied to the user interface elements is to remove the element to another display. FIG. 12 is a screen shot illustrating customization of a user interface element by moving the user interface element to a second display according to some embodiments of the disclosure. A user may identify a user interface element in region 702 for removal from the main display 1252 to a secondary display 1254 as element 1210. The secondary display 1254 may be a second monitor attached to the information handling system, a status indicator display, or a display on another information handling system. In one example, a small status display may be located above a keyboard of the information handling system, and that status display may be configured to display the user interface element from region 702 while the application is executing. In another example, a cellular phone display may be configured to display the user interface element from region 702 while the application is executing. In some embodiments, the removal of the user interface element to the second display 1254 may be a customization that is applied regardless of the user's focused attention. For example, the user interface element of an application may be moved to a second display 1254 during the entire execution of the application based on a definition within an application profile. In some embodiments, the display of the user interface element on the second display 1254 may be a default position, but the user interface element may return to the primary display 1252 when the user's focused attention is at the region 702 on the primary display 1252 that the user interface element is removed from.

A method for removing user interface elements from the primary display for presentation on a secondary display may include identifying an application profile corresponding to an application executing on the information handling system. Rules may be read from the application profile that define user interface elements in an application window of the application. During execution of the application, the user interface elements may be read from the display and presented on a second display based on rules in the application profile. Reading and/or modifying the user interface elements may be performed through, for example, bit-blitting, using operating system application programming interfaces (e.g., WINDOWS Desktop Duplication API, or the WINDOWS Graphics Capture API), and/or other hardware or software techniques. When the display element is removed from the primary display, a texture may be used to fill in the missing pixels behind the removed user interface element, such as by using a texture generated according to the methods of FIG. 10 or FIG. 11. The user interface element may be returned to the primary display based on the defined rules of the application profile.

Figure 13:
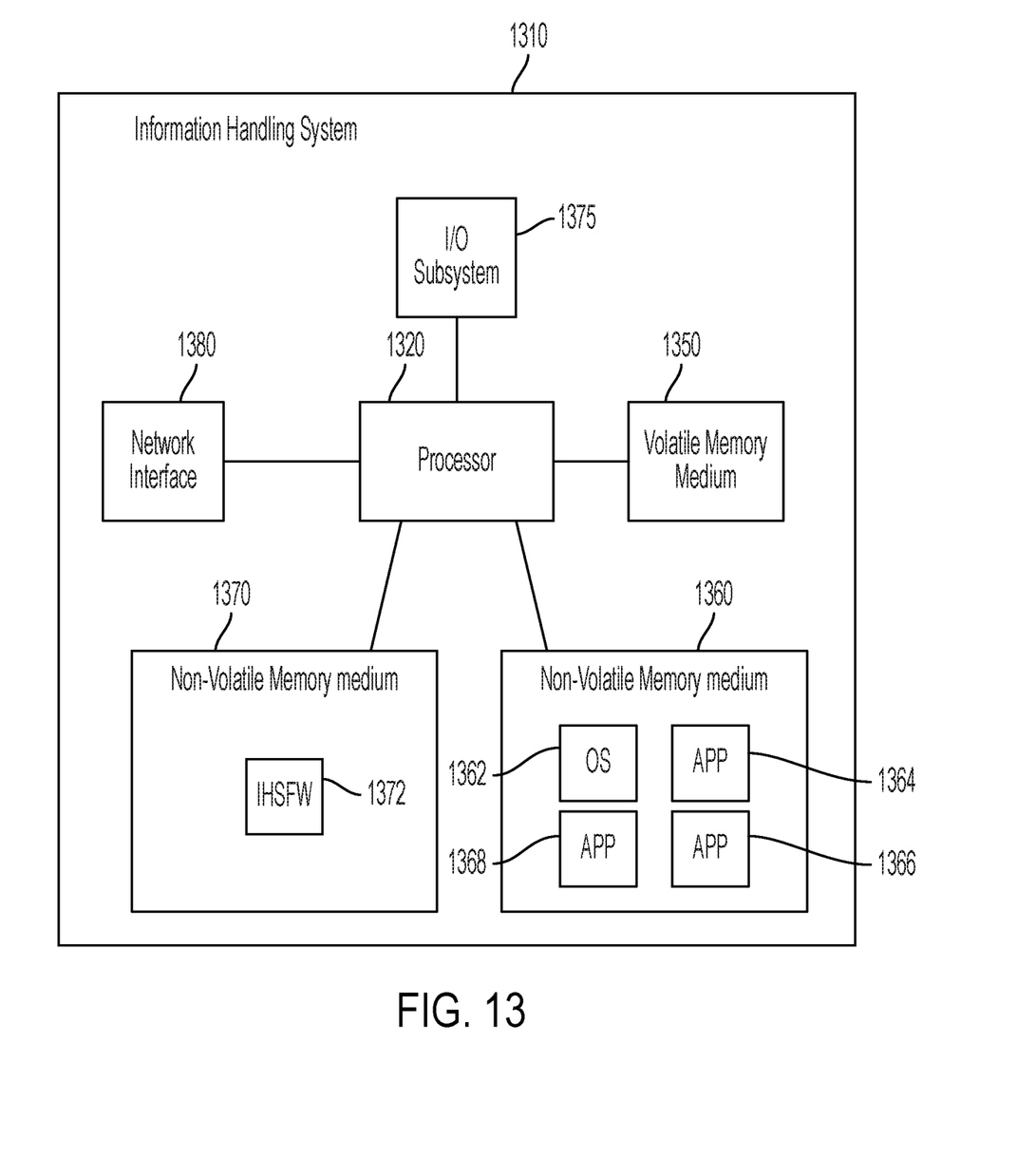
FIG. 13 is an example information handling system for implementing the lighting effects system described in various embodiments of this disclosure.

An example information handling system for implementing the customized user interface elements described in various embodiments of this disclosure is shown in FIG. 13. FIG. 13 is an example information handling system for implementing the lighting effects system described in various embodiments of this disclosure. An information handling system (IHS) 1310 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to some embodiments. For example, IHS 1310 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In some embodiments, a portable IHS 1310 may include or have a form factor of that of or similar to one or more of a laptop, a notebook, a telephone, a tablet, and a PDA, among others. For example, a portable IHS 1310 may be readily carried and/or transported by a user (e.g., a person). In some embodiments, components of IHS 1310 may include one or more storage devices, one or more communications ports for communicating with external devices as well as various input and output (EO) devices, such as a keyboard, a mouse, and a video display, among others. In some embodiments, IHS 1310 may include one or more buses operable to transmit communication between or among two or more hardware components. In one example, a bus may include one or more of a memory bus, a peripheral bus, and a local bus, among others. In another example, a bus of IHS 1310 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In some embodiments, IHS 1310 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In some embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 1310 may include a processor 1320, a volatile memory medium 1350, nonvolatile memory media 1360 and 1370, an I/O subsystem 1375, and a network interface 1380. As illustrated, volatile memory medium 1350, non-volatile memory media 1360 and 1370, I/O subsystem 1375, and network interface 1380 may be communicatively coupled to processor 1320.

In some embodiments, one or more of volatile memory medium 1350, non-volatile memory media 1360 and 1370, I/O subsystem 1375, and network interface 1380 may be communicatively coupled to processor 1320 via one or more buses, one or more switches, and/or one or more root complexes, among others. In one example, one or more of volatile memory medium 1350, non-volatile memory media 1360 and 1370, I/O subsystem 1375, and network interface 1380 may be communicatively coupled to processor 1320 via one or more PCI-Express (PCIe) root complexes. In another example, one or more of an I/O subsystem 1375 and a network interface 1380 may be communicatively coupled to processor 1320 via one or more PCIe switches.

In some embodiments, the term "memory medium" may mean a "storage device", a "memory", a "memory device", a "tangible computer readable storage medium", and/or a "computer-readable medium." For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read only memory (EEPROM), and/or a flash memory, a solid state drive (SSD), or any combination of the foregoing, among others.

In some embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 1350 may include volatile storage such as, for example, RAM, DRAM (dynamic RAM), EDO RAM (extended data out RAM), SRAM (static RAM), etc. One or more of non-volatile memory media 1360 and 1370 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In some embodiments, a memory medium can include one or more volatile storages and/or one or more nonvolatile storages.

In some embodiments, network interface 1380 may be utilized in communicating with one or more networks and/or one or more other information handling systems. In one example, network interface 1380 may enable IHS 1310 to communicate via a network using a suitable transmission protocol and/or standard. In a second example, network interface 1380 may be coupled to a wired network. In a third example, network interface 1380 may be coupled to an optical network. In another example, network interface 1380 may be coupled to a wireless network.

In some embodiments, network interface 1380 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data using a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In some embodiments, processor 1320 may execute processor instructions in implementing one or more systems, one or more flowcharts, one or more methods, and/or one or more processes described herein. In one example, processor 1320 may execute processor instructions from one or more of memory media 1350-1370 in implementing one or more systems, one or more flowcharts, one or more methods, and/or one or more processes described herein. In another example, processor 1320 may execute processor instructions via network interface 1380 in implementing one or more systems, one or more flowcharts, one or more methods, and/or one or more processes described herein.

In some embodiments, processor 1320 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 1320 may interpret and/or execute program instructions and/or process data stored locally (e.g., via memory media 1350-1370 and/or another component of UTS 1310). In another example, processor 1320 may interpret and/or execute program instructions and/or process data stored remotely (e.g., via a network storage resource).

In some embodiments, I/O subsystem 1375 may represent a variety of communication interfaces, graphics interfaces, video interfaces, user input interfaces, and/or peripheral interfaces, among others. For example, I/O subsystem 1375 may include one or more of a touch panel and a display adapter, among others. In one example, a touch panel may include circuitry that enables touch functionality in conjunction with a display that is driven by a display adapter.

As shown, non-volatile memory medium 1360 may include an operating system (OS) 1362, and applications (APPs) 1364-1368. In some embodiments, one or more of OS 1362 and APPs 1364-1368 may include processor instructions executable by processor 1320. In one example, processor 1320 may execute processor instructions of one or more of OS 1362 and APPs 1364-1368 via non-volatile memory medium 1360. In another example, one or more portions of the processor instructions of the one or more of OS 1362 and APPs 1364-1368 may be transferred to volatile memory medium 1350, and processor 1320 may execute the one or more portions of the processor instructions of the one or more of OS 1362 and APPs 1364-1368 via volatile memory medium 1350.

As illustrated, non-volatile memory medium 1370 may include information handling system firmware (IHSFW) 1372. In some embodiments, IHSFW 1372 may include processor instructions executable by processor 1320. For example, IHSFW 1372 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one example, processor 1320 may execute processor instructions of IHSFW 1372 via non-volatile memory medium 1370. In another instance, one or more portions of the processor instructions of IHSFW 1372 may be transferred to volatile memory medium 1350, and processor 1320 may execute the one or more portions of the processor instructions of IHSFW 1372 via volatile memory medium 1350.

In some embodiments, processor 1320 and one or more components of IHS 1310 may be included in a system-on-chip (SoC). For example, the SoC may include processor 1320 combined with one or more of a platform controller hub (not specifically illustrated), a volatile memory medium, a non-volatile memory medium, I/O controller, network interface, or other IHS component.

The schematic flow chart diagrams of FIG. 1, FIG. 4, FIG. 6, FIG. 10, and FIG. 11 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random-access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although execution of methods on processors are described throughout the detailed description, aspects of the invention may be executed on different kinds of processors, such as graphics processing units (GPUs), central processing units (CPUs), digital signal processors (DSPs), and application-specific integrated circuits (ASICs). As another example, although processing of certain kinds of data in applications may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving, by an information handling system, an application profile comprising at least one rule for applying a customization to at least one specified user interface element of a plurality of user interface elements within an application window of an application;
   detecting a launch of the application;
   activating the application profile in response to detecting the launch of the application;
   receiving an indication of a user's focused attention in the application window during execution of the application;
   identifying at least one user interface element in the application window receiving the user's focused attention based on the indication of the user's focused attention during execution of the application; and
   applying at least one customization to the identified at least one user interface element based on the at least one rule during execution of the application.

2. The method of claim 1, further comprising applying a different customization to a second user interface element not identified as receiving the user's focused attention.

3. The method of claim 2, wherein the step of applying the at least one customization comprises decreasing a transparency of the identified at least one user interface element and increasing a transparency of the second user interface element.

4. The method of claim 1, wherein the step of applying at least one customization comprises adjusting at least one of a transparency, saturation, or contrast to the identified at least one user interface element.

5. The method of claim 1, further comprising:
   receiving a screen shot of an application window;
   identifying a potentially-customizable user interface element within the application window; and
   receiving a user-defined rule specifying the potentially-customizable user interface element and a customization for the one of the potentially-customizable user interface elements.

6. The method of claim 5, wherein the step of identifying the potentially-customizable user interface element comprises: receiving an indication of a region within the application window; and applying an algorithm to identify boundaries of the user interface element.

7. The method of claim 1, wherein the step of receiving the indication of the user's focused attention comprises receiving an indication of an area of a user's gaze on an application window.

8. The method of claim 1, wherein the step of applying at least one customization comprises: removing the identified user interface element from a primary display; presenting the identified user interface element on a secondary display.

9. An information handling system, comprising:
 a processor configured to perform steps comprising:
  receiving, by an information handling system, an application profile comprising at least one rule for applying a customization to at least one specified user interface element of a plurality of user interface elements within an application window of an application;
  detecting a launch of the application;
  activating the application profile in response to detecting the launch of the application;
  receiving an indication of a user's focused attention in the application window during execution of the application;
  identifying at least one user interface element in the application window receiving the user's focused attention based on the indication of the user's focused attention during execution of the application; and
  applying at least one customization to the identified at least one user interface element during execution of the application.

10. The information handling system of claim 9, wherein the processor is further configured to perform steps comprising applying a different customization to a second user interface element not identified as receiving the user's focused attention.

11. The information handling system of claim 10, wherein the step of applying the at least one customization comprises decreasing a transparency of the identified at least one user interface element and increasing a transparency of the second user interface element.

12. The information handling system of claim 9, further comprising a front-facing camera, wherein the step of receiving the indication of the user's focused attention comprises receiving an indication of an area of a user's gaze on an application window.

13. A method, comprising:
 receiving, by an information handling system, a screen shot of an application window;
 identifying a potentially-customizable user interface element within the application window;
 receiving a first user-defined rule specifying the potentially-customizable user interface element and a customization to apply during execution of the application for the one of the potentially-customizable user interface elements; and
 assigning the first user-defined rule to an application profile associated with an application that generates the application window.

14. The method of claim 13, wherein the step of identifying the potentially-customizable user interface element comprises: receiving an indication of a region within the application window; and applying an algorithm to identify boundaries of the user interface element.

15. The method of claim 13, wherein the step of receiving the first user-defined rule comprises receiving a customization comprising at least one of a transparency, a saturation, or a contrast.

16. The method of claim 1, wherein the identified at least one user interface element comprises at least one of a button; an on-screen status indicator; or a status bar.

17. The method of claim 1, further comprising removing a second user interface element different from the identified at least one user interface element from a location on a first display to a second display.

18. The method of claim 17, further comprising: receiving a second indication of user's focused attention in the application window at the location on the first display; and moving the second user interface element from the second display to the location on the first display.

19. The information handling system of claim 9, wherein the processor is further configured to perform steps comprising:
 receiving a second indication of user's focused attention in the application window at the location on the first display; and moving the second user interface element from the second display to the location on the first display;
 receiving a second indication of user's focused attention in the application window at the location on the first display; and
 moving the second user interface element from the second display to the location on the first display.

20. The method of claim 13, wherein receiving a first user-defined rule comprises receiving a mask, a position, and a texture definition.

* * * * *